United States Patent
Tang

(10) Patent No.: US 11,337,250 B2
(45) Date of Patent: May 17, 2022

(54) METHOD AND DEVICE FOR TRANSMITTING INFORMATION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 148 days.

(21) Appl. No.: 16/308,449

(22) PCT Filed: Aug. 16, 2016

(86) PCT No.: PCT/CN2016/095538
§ 371 (c)(1),
(2) Date: Jun. 18, 2019

(87) PCT Pub. No.: WO2018/032357
PCT Pub. Date: Feb. 22, 2018

(65) Prior Publication Data
US 2019/0274170 A1    Sep. 5, 2019

(51) Int. Cl.
*H04W 74/08* (2009.01)
*H04W 76/10* (2018.01)
*H04W 84/04* (2009.01)

(52) U.S. Cl.
CPC ....... *H04W 74/0833* (2013.01); *H04W 76/10* (2018.02); *H04W 84/042* (2013.01)

(58) Field of Classification Search
CPC ............ H04W 74/002; H04W 74/008; H04W 74/0833; H04W 74/0866; H04W 76/10; H04W 84/042
See application file for complete search history.

(56) References Cited

U.S. PATENT DOCUMENTS

| 9,750,063 | B2 * | 8/2017 | Zhu ................. H04W 76/00 |
| 10,389,491 | B2 * | 8/2019 | Huss ................ H04L 1/1861 |
| 2009/0219864 | A1 * | 9/2009 | Parolari ............ H04W 72/1268 370/329 |

(Continued)

FOREIGN PATENT DOCUMENTS

| CN | 103491643 | 1/2014 |
| CN | 103687043 | 3/2014 |

(Continued)

OTHER PUBLICATIONS

JPO, Office Action for JP Application No. 2018-567855, dated Feb. 28, 2020.

(Continued)

*Primary Examiner* — Kan Yuen
(74) *Attorney, Agent, or Firm* — Hodgson Russ LLP

(57) ABSTRACT

Provided are a method and a device for transmitting information. The method includes: a first device sending a random access message to a second device, wherein the random access message carries first dedicated information of the first device and/or indication information used to indicate second dedicated information of the first device, and the first dedicated information and the second dedicated information are used to establish a connection between the first device and the second device.

14 Claims, 4 Drawing Sheets

(56) References Cited

U.S. PATENT DOCUMENTS

| | | | | |
|---|---|---|---|---|
| 2010/0296472 | A1* | 11/2010 | Lee | H04W 36/0094 |
| | | | | 370/329 |
| 2012/0213089 | A1* | 8/2012 | Shi | H04L 5/001 |
| | | | | 370/241 |
| 2013/0279330 | A1 | 10/2013 | Feng et al. | |
| 2015/0009936 | A1* | 1/2015 | Quan | H04L 1/189 |
| | | | | 370/329 |
| 2016/0135236 | A1 | 5/2016 | Zhu et al. | |
| 2016/0338116 | A1* | 11/2016 | Bergstrom | H04W 28/02 |
| 2018/0098356 | A1* | 4/2018 | Li | H04W 72/1278 |
| 2019/0053285 | A1* | 2/2019 | Martin | H04W 88/02 |
| 2019/0098670 | A1* | 3/2019 | Jia | H04W 74/0833 |
| 2019/0327661 | A1* | 10/2019 | Li | H04W 40/22 |

FOREIGN PATENT DOCUMENTS

| | | |
|---|---|---|
| EP | 2941076 | 11/2015 |
| JP | 2007300505 | 11/2007 |
| JP | 2010507319 | 3/2010 |
| JP | 2014531856 | 11/2014 |
| JP | 2015510718 | 4/2015 |
| JP | 6803409 | 12/2020 |
| WO | 2008111821 | 9/2008 |
| WO | 2015184900 | 12/2015 |
| WO | 2016061735 | 4/2016 |
| WO | 2016090782 | 6/2016 |

OTHER PUBLICATIONS

WIPO, ISR for PCT/CN2016/095538, May 2, 2017.

Qualcomm Incorporated, "Signalling Reduction by RRC Message Combining," 3GPP TSG-RAN WG2 Meeting #82, R2-132077, May 2013, 7 pages.

IPI, Office Action for IN Application No. 201917004104, dated Jul. 9, 2020.

EPO, Office Action for EP Application No. 16913117.4, dated Jul. 1, 2020.

TIPO, Office Action for TW Application No. 106123101, dated Nov. 19, 2020.

Huawei, HiSilicon, "Random access proceudre in NR", 3GPP TSG-RAN WG2 Meeting #95, Gothenburg, Swedish, Aug. 26, 2016.

Samsung, "Random access procedure in NR", 3GPP TSG-RAN WG2 Meeting #95, Gothenburg, Swedish, Aug. 26, 2016.

CNIPA, First Office Action for CN Application No. 201680086646.3, dated Aug. 27, 2021.

EPO, Extended European Search Report for EP Application No. 21191205.0, dated Nov. 5, 2021.

IPIN, First Office Action for IN Application No. 202018044864, dated Nov. 16, 2021.

CNIPA, Second Office Action for CN Application No. 201680086646.3, dated Mar. 30, 2022.

JPO, Office Action for JP Application No. 2020-194914, dated Jan. 18, 2022.

* cited by examiner

METHOD AND DEVICE FOR TRANSMITTING INFORMATION

CROSS-REFERENCE TO RELATED APPLICATION

This application is a U.S. national phase of PCT Application No. PCT/CN2016/095538, filed Aug. 16, 2016, the entire disclosure of which is incorporated herein by reference.

TECHNICAL FIELD

The present disclosure relates to the field of communication, and in particular, relates to a method and device for transmitting information.

BACKGROUND

In the Long Term Evolution (LTE), when User Equipment (UE) has no service for a period of time, in order to save resources of the air interface and also save the power of the UE, the UE may be switched into an idle state. After the UE enters into the idle state, if a service (including a calling service and a called service) needs to be initiated, the UE needs to transmit a random access message to the network, which enables the UE to establish a communication connection with the network. After the UE receives a random access response sent by the network, the UE transmits related information for establishing the connection between the UE and the network to the network.

However, as the evolution of the wireless communication system, the performance of access control procedure between the devices that initiate the random access procedure needs to be further improved, such that the transmitting device can access the receiving device more quickly or flexibly.

SUMMARY

The embodiments of the present disclosure provide a method and a device for transmitting information, which can further improve the device access control performance, so that the transmitting device can access the receiving device more quickly or flexibly.

As a first aspect, there is provided a method for transmitting information, including: transmitting, by a first device, a random access message to a second device, wherein the random access message carries first dedicated information of at least one of the first device and indication information for indicating second dedicated information of the first device, and the first dedicated information and the second dedicated information are configured to establish a connection between the first device and the second device.

As a second aspect, there is provided a method for transmitting information, including: receiving a random access message transmitted by a first device, wherein the random access message carries at least one of first dedicated information of the first device and indication information for indicating second dedicated information of the first device, and the first dedicated information and the second dedicated information are configured to establish a connection between the first device and a second device.

As a third aspect, there is provided a device for performing the methods of the first aspect or any of the possible implementations of the above-described first aspect. In particular, the device includes units for performing the methods of any of the above-described first aspect or any of the possible implementations of the first aspect.

As a fourth aspect, there is provided a device for performing the methods of any of the above-described second aspect or any of the possible implementations of the second aspect. In particular, the device includes units for performing the methods of any of the above-described second aspect or any of the possible implementations of the second aspect.

As a fifth aspect, there is provided a device, including: a memory, a processor, a transceiver and a bus system. The memory, the processor and the transceiver are connected by the bus system, the memory is configured to store instructions, the processor is configured to execute the instructions stored in the memory, and when the instructions are executed, the processor executes the method of the first aspect and controls the transceiver to receive the input data and information, and output data such as an operation result.

As a sixth aspect, there is provided a device, including: a memory, a processor, a transceiver and a bus system. The memory, the processor and the transceiver are connected by the bus system, the memory is configured to store instructions, the processor is configured to execute the instructions stored in the memory, and when the instructions are executed, the processor executes the method of the second aspect and controls the transceiver to receive the input data and information, and output data such as an operation result.

As a seventh aspect, there is provided a computer storage medium storing a computer program, the computer program including instructions for performing the method of the first aspect or any of the possible implementations of the first aspect.

As an eighth aspect, there is provided a computer storage medium storing a computer program, the computer program including instructions for performing the method of the second aspect or any of the possible implementations of the second aspect.

In the present disclosure, the name of the device does not limit the device per se, and in actual implementation, the device may appear with other names. As long as the functions of the individual devices are similar to those in the present disclosure, they are within the scope of the claims and the equivalents thereof.

These and other aspects of the present disclosure will be more apparent from the following description of the embodiments.

BRIEF DESCRIPTION OF THE DRAWINGS

In order to more clearly illustrate the technical solutions of the embodiments of the present disclosure, the drawings to be used in the embodiments of the present disclosure will be briefly described below. It is obvious that the drawings described below are only some embodiments of the present disclosure, and other drawings may also be acquired without paying for creative labor for those of ordinary skill in the art in view of the drawings.

DETAILED DESCRIPTION

Figure 1:
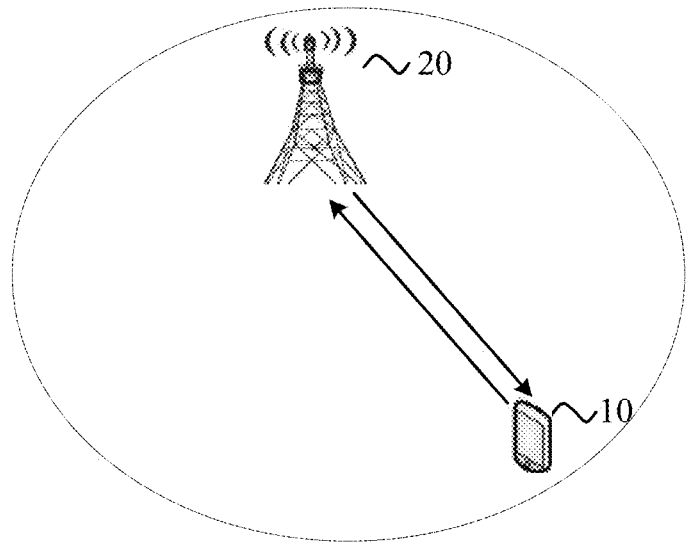
FIG. 1 shows a possible application scenario of an embodiment of the present disclosure.

The technical solutions in the embodiments of the present disclosure are clearly and completely described in the following with reference to the accompanying drawings in the embodiments of the present disclosure. It is obvious that the described embodiments are a part of the embodiments of the present disclosure, and not all embodiments. All other embodiments acquired by those of ordinary skill in the art based on the embodiments of the present disclosure without departing from the inventive scope shall fall within the protection scope of the present disclosure.

It should be understood that the technical solutions of the embodiments of the present disclosure may be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or future 5G system.

In particular, the technical solutions of the embodiments of the present disclosure may be applied to various communication systems based on non-orthogonal multiple access technologies, such as a Sparse Code Multiple Access (SCMA) system, Low Density Signature ("LDS") system, etc. The SCMA system and the LDS system may also be referred to as other names in the field of communication. Further, the technical solutions of the embodiments of the present disclosure may be applied to a multi-carrier transmission system adopting a non-orthogonal multiple access technology, such as Orthogonal Frequency Division Multiplexing (OFDM), Filter Bank Multi-Carrier (FBMC), Generalized Frequency Division Multiplexing (GFDM), Filtered Orthogonal Frequency Division Multiplexing ("F-OFDM") system or the like adopting non-orthogonal multiple access technology.

The terminal device in the embodiments of the present disclosure may refer to user equipment (UE), an access terminal, a user unit, a user station, a mobile station, a remote station, a remote terminal, a mobile device, a user terminal, a terminal, and a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), handheld device with wireless communication capabilities, computing devices or other processing device connected to wireless modem, an in-vehicle device, a wearable device, a terminal device in future 5G networks, or a terminal device in the Public Land Nobile Network (PLMN) in the future, which is not limited in the embodiments of the present disclosure.

The network device in the embodiments of the present disclosure may be a device for communicating with the terminal device. The network device may be a Base Transceiver Station (BTS) in GSM or CDMA, or a NodeB (NB) in a WCDMA system, or may be an Evolutional NodeB (eNB or eNodeB) in the LTE system, or may be a wireless controller in a Cloud Radio Access Network (CRAN) scenario, or the network device may be a relay station, an access point, an in-vehicle device, a wearable device, a network device in a future 5G network, or a network device in a future evolved PLMN network, and the like, which is not limited in the embodiments of the present disclosure.

FIG. 1 is a schematic diagram of an application scenario according to the present disclosure. The communication system in FIG. 1 may include a terminal device 10 and a network device 20. The network device 20 is configured to provide communication services for the terminal device 10 and access the core network. The terminal device 10 accesses the network by searching for a synchronization signal, a broadcast signal, and the like transmitted by the network device 20, thereby performing communication with the network. The arrow shown in FIG. 1 may represent an uplink/downlink transmission by a cellular link between the terminal device 10 and the network device 20.

In the LTE system, after the power is turned on, the terminal completes cell residence through a series of processes such as PLMN selection, cell selection, and cell reselection. When the cell resident is completed, the terminal enters into the idle state, that is, at this time, the terminal has completed the registration in the network, but does not establish a connection with the network, and is unable to transmit data in real time. After the terminal enters into the idle state, if a service (including a calling service and a called service) needs to be initiated, a connection establishment process is initiated according to the configuration information in the system information.

Figure 2:
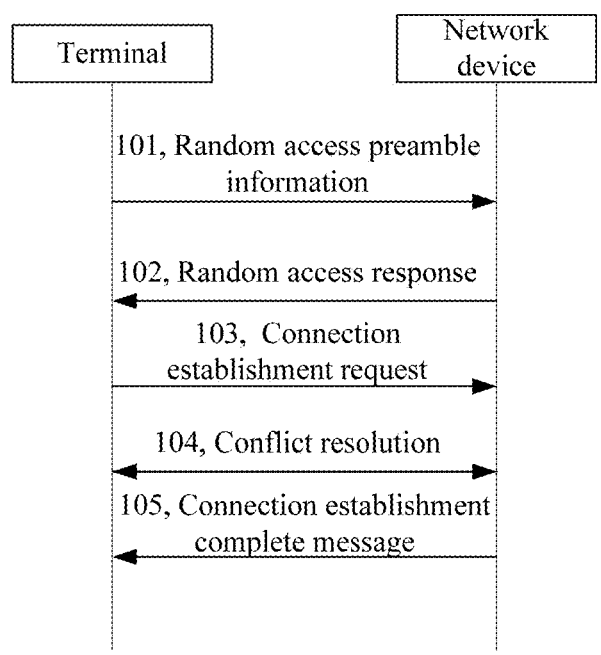
FIG. 2 shows a connection establishment process between a terminal and a network device.

For ease of understanding, the connection establishment process will be briefly introduced with reference to FIG. 2. The method shown in FIG. 2 includes the following steps:

101. The terminal transmits the random access preamble information carrying a preamble. That is, the terminal randomly selects one of the preambles configured by the base station, and transmits it to the base station.

102. After receiving the random access preamble information, the base station transmits a random access response to the terminal, wherein the random access response carries an uplink Timing Advance (TA) and a temporary Cell Radio Network Temporary Identifier (C-RNTI) and uplink resource allocation.

103. The terminal transmits a connection establishment request to the base station according to the corresponding uplink resource allocation, wherein the main information contained therein is a terminal identifier and a connection establishment reason, such as: an emergency call, a high priority access, a called access, a calling signaling, calling data, low delay sensitive pair, a voice service, etc.

104. The base station copies the connection establishment request sent by the terminal, and feeds back to the terminal through the connection establishment request to perform a contention resolution.

105. The base station transmits a connection establishment message to the terminal, wherein the message includes a dedicated resource configuration for configuring the resource before the terminal enters into a connected state.

106. The terminal feeds back a connection establishment complete message, which includes the PLMN information registered by the terminal, the MME information of the terminal, and the Non-Access Stratum information of the terminal.

In order to further improve the terminal access control performance, the embodiments of the present disclosure provide an optimized connection establishment process.

It should be understood that the embodiments of the present disclosure will be described by applying to a 5G communication system, but the present disclosure is not limited thereto. Additionally, the terms "system" and "network" are used interchangeably herein. The term "and/or" in this context is merely an association relationship describing the associated objects, indicating that there may be three relationships, for example, A and/or B may indicate three situations: A exists separately, both A and B exist at the same time, B exists separately. In addition, the character "/" in this disclosure generally indicates that the contextual objects are in an "or" relationship.

Figure 3:
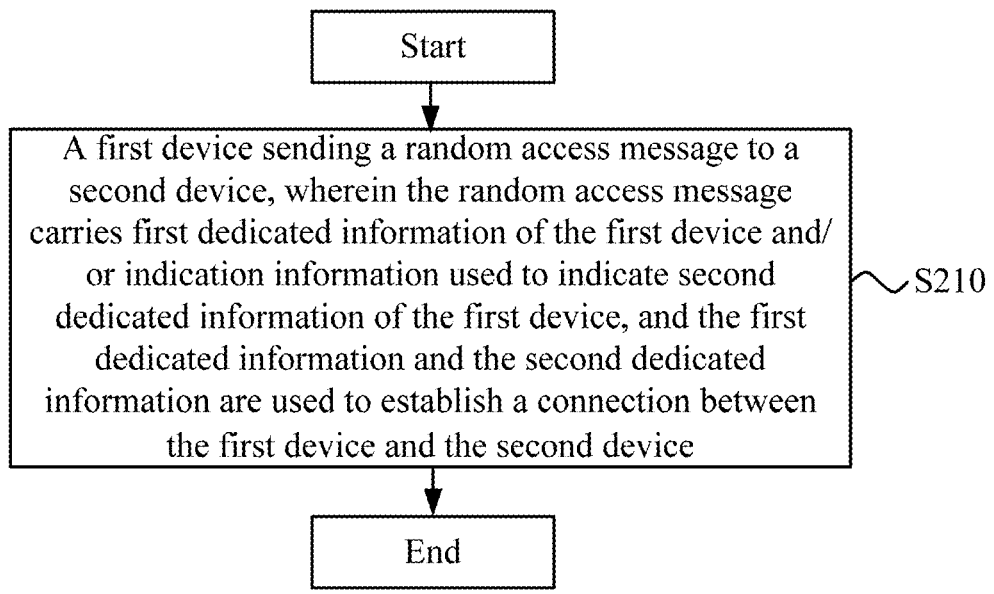
FIG. 3 is a schematic block diagram of a method for transmitting information according to an embodiment of the present disclosure.

FIG. 3 is a schematic block diagram of a method 200 for transmitting information according to an embodiment of the present disclosure. As shown in FIG. 3, the method 200 includes:

S210, a first device transmits a random access message to a second device, wherein the random access message carries first dedicated information of the first device and/or indication information for indicating second dedicated information of the first device, and the first dedicated information and the second dedicated information are configured to establish a connection between the first device and the second device.

It should be understood that the technical solutions of the present disclosure is applicable to a wireless communication technology scenario, and may also be applied to a device to device (D2D) scenario. The first device in the embodiments of the present disclosure may be a terminal device, and the second device may be a network device or terminal equipment, or the second device may also be a relay device or the like. The present disclosure is not limited thereto. For the convenience of description, the following embodiments are described by taking the first device as the terminal device and the second device as the network device.

Specifically, after the terminal is powered on, the terminal may select a suitable cell from the selected PLMNs for resident, and when the terminal is resident in a certain cell, the terminal may receive the system information and the cell broadcast information like paging. Generally, when the terminal is powered on for the first time, the registration process needs to be performed, on the one hand, the mutual authentication may be performed, and on the other hand, the network device may acquire some basic information of the terminal. After that, the terminal is in an idle state. When the terminal switches from the idle state to the connected state, the terminal needs to initiate a random access procedure to the network device. Only after the random access is completed, the terminal and the network device may transmit and receive data from each other normally. At this time, the terminal needs to transmit a random access preamble selected randomly or a random access preamble assigned by the network device to the terminal device, thereby requesting uplink resources or uplink TA synchronization from the network device. The terminal may carry some dedicated information of the terminal or indication information for indicating the configuration of dedicated information in the message for transmitting the preamble. For example, the dedicated information is the identifier of the terminal, the reason why the terminal initiates a connection request, and the like.

Therefore, in the method for transmitting information provided by the embodiments of the present disclosure, by carrying the first dedicated information of the first device and/or the indication information for indicating the second dedicated information of the first device in the random access message, access process is optimized, and the access control performance of the first device can be further improved, so that the first device can access the second device faster or more flexibly.

It should be understood that the random access message in the embodiments of the present disclosure may be the first message that the terminal switches from the idle state to the connected state, or may be used to indicate that the terminal has a service to be processed, or in other word, the random access message may be a message carrying random access preamble information. The present disclosure is not limited thereto.

It should also be understood that the information included in the first dedicated information and the second dedicated information may be identical, partially identical, or completely different. The present disclosure is not limited thereto.

Optionally, the first dedicated information and/or the second dedicated information of the terminal may be related information that the terminal establishes a connection with the network device or related configuration information that the terminal establishes a connection with the network device. For example, it may be the initial identification of the terminal (temporary mobile user identifier or random number, etc.), the reason for the connection establishment of the terminal (including emergency call, high priority access, called access, calling signaling, calling data, the low-latency sensitivity, the voice service, etc.), may also be the size and/or format of the signaling sent by the terminal later, and may also be the PLMN information, the MME information, and the NAS information needing to be transmitted by the terminal. The content included in the first dedicated information and/or the second dedicated information is not limited in the present disclosure.

Specifically, if the first dedicated information or the second dedicated information includes the primary information carried in the connection establishment request message transmitted by the terminal to the network device, such as the identifier of the terminal, the connection establishment reason, etc., the connection establishment process can be shortened to a certain extent, thereby reducing the access delay of the terminal. If the first dedicated information or the second dedicated information includes the primary information carried in the connection establishment complete message transmitted by the terminal to the network device, such as the PLMN information registered by the terminal, the MME information and the NAS information of the terminal, the connection establishment process can be shortened to a certain extent, thereby reducing the access delay of the terminal. If the first dedicated information or the second dedicated information includes the size and format of the first signaling to be sent by the terminal to the network device, the terminal may access the network device more flexibly.

Optionally, the content carried in the random access message may be configured by the network device or determined by the terminal and the network device in advance.

Optionally, in the embodiments of the present disclosure, the random access message carries the indication information, the indication information is configured to indicate the network device to acquire the second dedicated information on a configured first resource, and the method further includes: transmitting the second dedicated information on the first resource.

Optionally, in another embodiment of the present disclosure, the random access message carries the indication information, the indication information is configured to indicate the terminal to transmit the second dedicated information to the network device, and the method further includes: transmitting the second dedicated information on a configured second resource.

Specifically, the terminal device may negotiate with the network device in advance to determine a plurality of resources for transmitting the second dedicated information, and the terminal device may select a certain resource from the plurality of resources that are negotiated in advance to transmit the second dedicated information, and indicate the network device to acquire the second dedicated information on the resource selected by the terminal. The terminal device may also negotiate with the network device to determine one resource for transmitting the second dedicated information, and indicate that the terminal has transmitted the second dedicated information, in this way, the network device may acquire the second dedicated information on the configured resource. The terminal may also negotiate with the network device in advance that as long as the random access message carries the random access preamble information, the network device may acquire the dedicated information on the configured resource based on the adopted random access preamble, or the network device may always monitor whether there is dedicated information on the configured resource(s). The present disclosure does not limit how to instruct the network device to acquire the second dedicated information.

Optionally, in another embodiment of the present disclosure, the random access message carries the first dedicated information and the indication information, and the first dedicated information and the second dedicated information include different information.

When the first dedicated information is carried in the random access message and/or the second dedicated information is transmitted on the configured resource, the first device may not need to wait for the uplink resource allocation of the second device, so that the time delay of the access of the first device can be reduced.

It should be understood that, in the embodiments of the present disclosure, the first resource and/or the second resource may be a time domain resource or a frequency domain resource, which is not limited by the present disclosure.

The various positional relationships of the dedicated information, the random access preamble information, and the random access message in the embodiments of the present disclosure are described below with reference to FIG. 4(a) to FIG. 4(c).

Figure 4A:
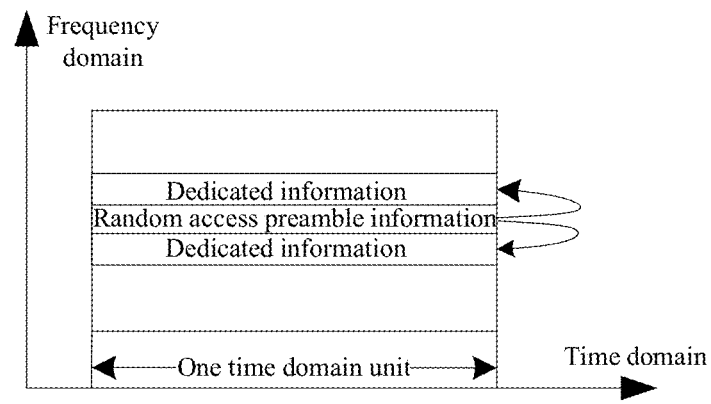
FIG. 4($a$) to FIG. 4($c$) are schematic diagrams showing transmission locations of random access preamble information and dedicated information according to an embodiment of the present disclosure.

As shown in FIG. 4(a), the resource for transmitting the random access preamble information and the dedicated information determined by negotiation between the terminal and the network device in advance or configured by the network device may be different frequency domain resources that are consecutive in the same time domain.

Figure 4B:
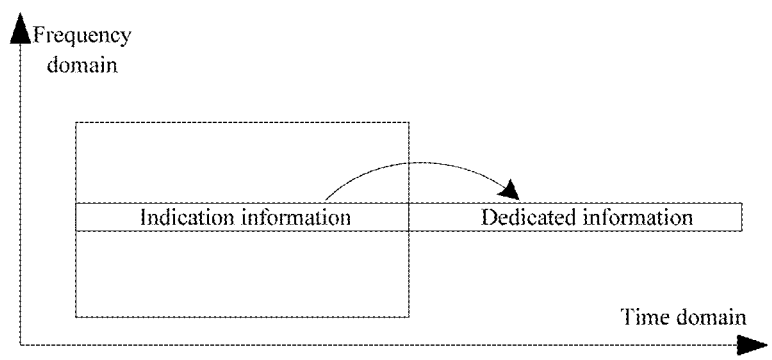

As shown in FIG. 4(b), the resource for transmitting the indication information and the dedicated information determined by negotiation between the terminal and the network device in advance or configured by the network device in advance may be different time domain resources that are consecutive.

Figure 4C:
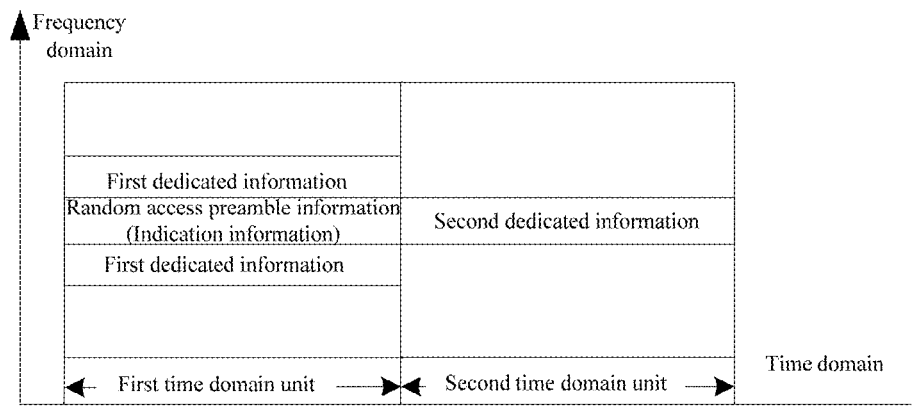

As shown in FIG. 4(c), the resources for transmitting the random access preamble information and the first dedicated information determined by negotiation between the terminal and the network device or configured by the network device in advance may be different frequency domain resources of the same time domain unit, and the resources for transmitting the random access preamble information and the second dedicated information determined by negotiation between the terminal and the network device or configured by the network device in advance may be on successively different time domain resources.

It should be understood that, in the embodiments of the present disclosure, the resources for transmitting the dedicated information and the random access preamble information and/or the indication information may also be discontinuous on the frequency domain resource or the time domain resource, and the foregoing embodiments are merely schematic description, and various combinations of the above embodiments are feasible, and the present disclosure is not limited thereto.

Further, if the dedicated information includes the size and/or format of the first signaling that is to be sent by the terminal later, the first signaling may be the signaling related to connection establishment, specifically, it may be the connection establishment request message, then after receiving the size and/or format of the first signaling, the network device may allocate an uplink resource to the terminal, and transmit the uplink allocated resource information to the terminal, so that the terminal further transmits the connection establishment request message to the network device.

Specifically, the subsequent steps may be determined according to the content of the dedicated information carried in the random access message. For example, if the dedicated information carries all the above information related to connection establishment of the terminal, then the terminal and the network device may not perform the connection establishment request interaction, such as, a connection establishment request message, a connection establishment message, and a connection establishment complete message. The terminal may carry various information configured by the network device for the terminal in the random access response message. If the dedicated information only includes the size and format of the first signaling to be transmitted, then the network device may know the size and format of the first signaling that will be sent subsequently, but the terminal device still needs various interactions of the connection establishment request with the network device. If the dedicated information only includes the content carried in the connection establishment request message, then the connection establishment request message may be omitted in the subsequent interaction process of the connection establishment request between the terminal and the network device. It should be noted that the contents included in the dedicated information are different, and the processes of accessing the network device by the terminal are different. Various solutions are within the embodiments of the present disclosure as long as the solutions enable the terminal to access the network device more quickly or more flexibly. For the sake of brevity, these solutions will not be elaborated herein.

Figure 5:
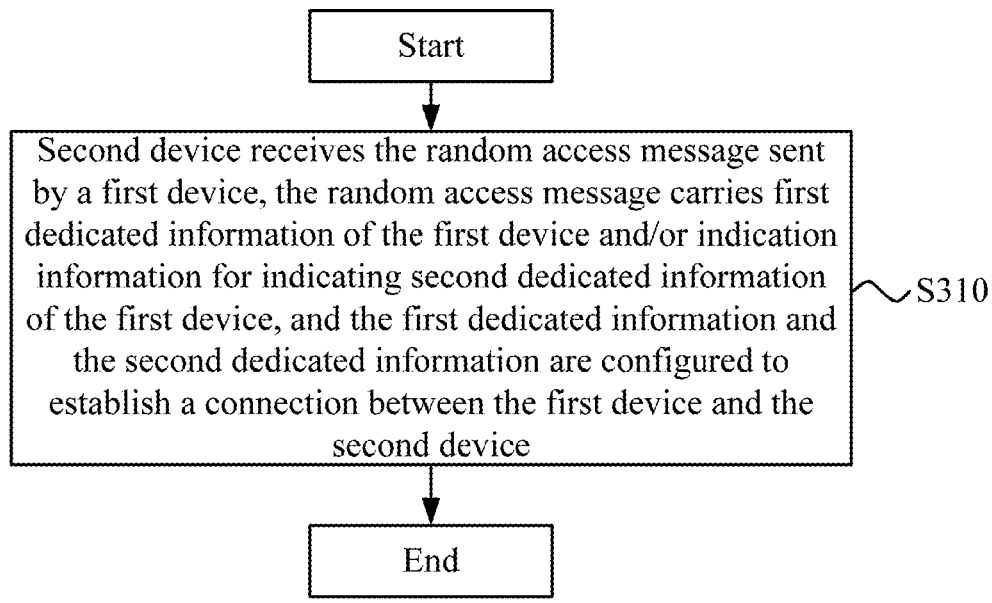
FIG. 5 is another schematic block diagram of a method for transmitting information according to an embodiment of the present disclosure.

FIG. 5 is another schematic block diagram of a method 300 for transmitting information according to an embodiment of the present disclosure. As shown in FIG. 5, the method 300 includes the following steps.

S310, a second device receives a random access message sent by a first device, wherein the random access message carries first dedicated information of the first device and/or indication information for indicating second dedicated information of the first device, and the first dedicated information and the second dedicated information are configured to establish a connection between the first device and the second device.

Specifically, if the terminal needs to transmit data to the network device or receive a signaling or data sent by the network device, in other word, the terminal needs to switch from an idle state to a connected state, the terminal device needs to perform an initial access process, that is, the terminal device may send a preamble code to the network device. When the network device detects the preamble code sent by the terminal, the network device may transmit a response on a downlink shared channel. The response may include an index number of the detected preamble sequence, time adjustment information for uplink synchronization, an initial uplink resource allocation and a temporary C-RNTI. If the network device receives the random access message that carries the first dedicated information and/or indicating the indication information of the second dedicated information, the network device may directly acquire the first dedicated information from the random access message and/or acquiring the second dedicated information on the configured first resource Therefore, in the method for transmitting information provided by the embodiments of the present disclosure, by receiving a random access message carrying the first dedicated information of the first device and/or the indication information indicating the second dedicated information of the first device, the access process is optimized, and the network access control performance can be further improved, so that the first device can access the second device better or more flexibly.

It should be understood that the random access message in the embodiments of the present disclosure may be the first message that the terminal switches from the idle state to the connected state, or may be used to indicate that the terminal has a service to be processed, or in other word, the random access message may be a message carrying random access preamble information. The present disclosure is not limited thereto.

It should also be understood that the information included in the first dedicated information and the second dedicated information may be identical, partially identical, or completely different. The present disclosure is not limited thereto.

Optionally, the first dedicated information or the second dedicated information includes at least one of the following information: identification information of the first device, reason why the first device requests to establish a connection, and a size and a format of a first signaling to be transmitted by the terminal, Public Land Mobile Network (PLMN) information registered by the first device, Mobility Management Entity (MME) information of the terminal, and Non-Access Network (NAS) information of the terminal.

As an embodiment of the present disclosure, optionally, the indication information is configured to indicate the network device to acquire the second dedicated information on a configured first resource. Specifically, the terminal device may negotiate with the network device in advance to determine a plurality of resources for transmitting the second dedicated information, and the terminal device may select the first resource from the plurality of the resources that are negotiated in advance to transmit the second dedicated information, and instruct the network device to acquire the second dedicated information on the first resource selected by the terminal. After receiving the indication information, the network device acquires the second dedicated information on the first resource indicated by the indication information.

As another embodiment of the present disclosure, optionally, the indication information is configured to indicate the terminal to transmit the second dedicated information to the network device. Specifically, the terminal device may also negotiate with the network device in advance to determine one resource for transmitting the second dedicated information, once the indication information is received, the network device may acquire the second dedicated information on the configured resource. Also, the terminal device may negotiate with the network device in advance that as long as the random access message carries the random access preamble information, the network device may acquire the dedicated information on the configured resource, or the network device may always monitor whether the second dedicated information is available on the configured resource. The present disclosure does not limit how to instruct the network device to acquire the second dedicated information.

In another embodiment of the present disclosure, optionally, the random access message carries the first dedicated information and the indication information, and the first dedicated information and the second dedicated information include different information.

Further, the method further includes: determining uplink resource allocation information of the terminal according to the size and/or format of the first signaling; transmitting the uplink resource allocation information to the terminal; and receiving the first signaling sent by the terminal according to the uplink resource allocation information.

Specifically, the subsequent steps may be determined according to the content of the dedicated information carried in the random access message. For example, if the dedicated information carries all the above information related to connection establishment of the terminal, then the terminal and the network device may not perform the interaction of the connection establishment request, such as, a connection establishment request message, a connection establishment message, and a connection establishment completion message. The terminal may carry in the random access response message various information which is configured by the network device for the terminal. If the dedicated information only includes the size and format of the first signaling to be transmitted, the network device may know the size and format of the first signaling that is subsequently sent, but the terminal device still needs various interactions of a connection establishment request with the network device. If the dedicated information only includes the content carried in the connection establishment request message, the connection establishment request message may be omitted in the subsequent interaction process of the connection establishment request between the terminal and the network device. It should be noted that the contents included in the dedicated information are different, and the processes of accessing the network device by the terminal are different. Various solutions are within the embodiments of the present disclosure as long as they can enable the terminal to access the network device more quickly or more flexibly. For the sake of brevity, various solutions will not be elaborated herein.

In addition, in the foregoing respective method embodiments, the network device is usually a base station, and the terminal is usually user equipment.

It should be understood that the interactions between the second device and the first device, related features, and functions described at the second device side correspond to the related features and functions of the first device, and for concise, which is not elaborated herein.

It should also be understood that, in various embodiments of the present disclosure, the sequence numbers of the above processes do not imply a sequence of executions, and the order of executions of the processes should be determined by the function and internal logic, and the implementation process of the embodiments of the present disclosure should not be construed as limiting.

The method for transmitting information according to the embodiments of the present disclosure has been described in detail above with reference to FIG. 3 to FIG. 5. Hereinafter, a device for transmitting information according to embodiments of the present disclosure will be described with reference to FIG. 6 to FIG. 9. The technical features described in the method embodiments may be applied to the following device embodiments.

Figure 6:
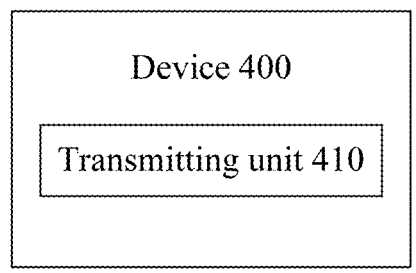
FIG. 6 is a schematic block diagram of a device for transmitting information according to an embodiment of the present disclosure.

FIG. 6 is a schematic block diagram of a device 400 for transmitting information according to an embodiment of the present disclosure. As shown in FIG. 6, the device 400 is a first device, and the device 400 includes: a transmitting unit 410.

The transmitting unit 410 is configured to transmit a random access message to the second device, wherein the random access message carries first dedicated information of the first device 400 and/or indication information for indicating second dedicated information of the first device 400, and the first dedicated information and the second dedicated information are configured to establish a connection between the first device 400 and the second device.

The technical solutions of the present disclosure may be applied to a scenario in which the device 400 is switched from the idle state to the connected state, and may also be applied to other scenario, and the technical solutions having the same concept as the embodiments of the present disclosure belong to expansions or extensions of the embodiments of the present disclosure.

Therefore, in the device for transmitting information provided by the embodiment of the present disclosure, by carrying the first dedicated information of the first device and/or the indication information for indicating the second dedicated information of the first device in the random access message, the access process is optimized, and the access control performance of the first device can be further improved, so that the first device can access the second device faster or more flexibly.

Optionally, in the embodiments of the present disclosure, the random access message carries the indication information, the indication information is configured to indicate the second device to acquire the second dedicated information on a configured first resource, and the transmitting unit 410 is also configured to:

transmit the second dedicated information on the first resource.

Optionally, in the embodiments of the present disclosure, the random access message carries the indication information, the indication information is configured to indicate the first device to transmit the second dedicated information to the second device, and the transmitting unit 410 is also configured to:

transmit the second dedicated information on a configured second resource.

Optionally, in the embodiments of the present disclosure, the random access message carries the first dedicated information and the indication information, and the first dedicated information and the second dedicated information includes different information.

Optionally, in the embodiments of the present disclosure, the first dedicated information or the second dedicated information includes at least one of the following information: identification information of the first device, reason why the first device requests to establish a connection, a size and/or a format of a first signaling to be transmitted by the first device, Public Land Mobile Network (PLMN) information registered by the first device, Mobility Management Entity (MME) information of the first device, and Non-Access Network (NAS) information of the first device.

Optionally, in the embodiments of the present disclosure, the first dedicated information or the second dedicated information includes the size and/or the format of the first signaling, the first signaling is configured to request to establish a connection between the first device and the second device, and the device 400 further includes:

a receiving unit 420, configured to receive uplink resource allocation information that is determined by the second device according to the size and/or the format of the first signaling; and the transmitting unit 410 is further configured to:

transmit the first signaling to the second device according to the uplink resource allocation information.

Optionally, the device 400 may be a terminal device, and the second device may be a network device or a terminal device.

It should be understood that the device 400 according to the embodiments of the present disclosure may correspond to the first device in the method 200 for transmitting information of the embodiments of the present disclosure, and the above and other operations and/or functions of respective modules in the device 400 are respectively implemented for the corresponding flow of each method of FIG. 3 and FIG. 4, and for brevity, which will not be repeated here.

Figure 7:
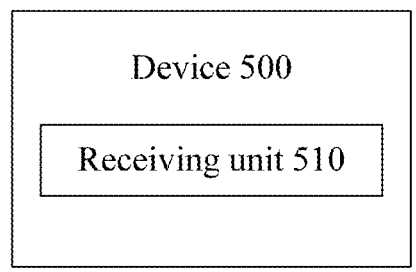
FIG. 7 is another schematic block diagram of a device for transmitting information according to an embodiment of the present disclosure.

FIG. 7 is another schematic block diagram of a device 500 for transmitting information according to an embodiment of the present disclosure. As shown in FIG. 7, the device 500 is a second device, and the device 500 includes: a receiving unit 510.

The receiving unit 510 is configured to receive a random access message sent by the first device, wherein the random access message carries first dedicated information of the first device and/or indication information for indicating second dedicated information of the first device, and the first dedicated information and the second dedicated information are configured to establish a connection between the first device and the second device.

Therefore, the device for transmitting information provided by the embodiments of the present disclosure optimizes the access process by receiving a random access message carrying the first dedicated information of the first device and/or the indication information indicating the second dedicated information of the first device, which may further improve the network access control performance, so that the first device can access the second device better or more flexibly.

Optionally, in the embodiments of the present disclosure, the random access message carries the indication information, the indication information is configured to indicate the second device to acquire the second dedicated information on a configured first resource, and the device 500 further includes:

a first acquiring unit 520, configured to acquire the second dedicated information on the first resource according to the indication information.

Optionally, in the embodiments of the present disclosure, the random access message carries the indication information, the indication information is configured to indicate the first device to transmit the second dedicated information to the second device, and the device 500 further includes:

a second acquiring unit 530, configured to acquire the second dedicated information on a configured second resource.

Optionally, in the embodiments of the present disclosure, the random access message carries the first dedicated information, and the device 500 further includes:

a third acquiring unit 540, configured to acquire the first dedicated information from the random access message.

Optionally, in the embodiments of the present disclosure, the random access message carries the first dedicated information and the indication information, and the first dedicated information and the second dedicated information include different information.

Optionally, in the embodiments of the present disclosure, the first dedicated information or the second dedicated information includes at least one of the following information: identification information of the first device, reason why the first device requests to establish a connection, a size and/or a format of a first signaling to be transmitted by the first device, Public Land Mobile Network (PLMN) information registered by the first device, Mobility Management Entity (MME) information of the first device, and Non-Access Network (NAS) information of the first device.

Optionally, in the embodiments of the present disclosure, the first dedicated information or the second dedicated information includes the size and/or the format of the first signaling, the first signaling is configured to request to establish a connection between the first device and the second device, and the device 500 further includes:

a determining unit 550, configured to determine uplink resource allocation information of the first device according to the size and format of the first signaling; and a transmitting unit 560, configured to transmit the uplink resource allocation information to the first device.

The receiving unit 510 is further configured to:
receive the first signaling that is sent by the first device according to the uplink resource allocation information.

Optionally, the first device may be a terminal device, and the device 500 may be a network device or a terminal device.

It should be understood that the device 500 according to the embodiments of the present disclosure may correspond to the second device in the method 300 for transmitting information of the embodiments of the present disclosure, and the above and other operations and/or functions of the each module in the device 500 are respectively implemented for the corresponding flow of each method of FIG. 4 and FIG. 5, and for brevity, which will not be repeated here.

It should be noted that, when the device provided by the foregoing embodiments implements the functions, only the division of each functional unit described above is illustrated. In an actual application, the functions may be distributed to be completed by different functional units as needed. The internal structure of the device is divided into different functional units to perform all or part of the functions described above. In addition, the device and method embodiments provided in the foregoing embodiments belong to the same concept, and the specific implementation process is described in detail in the method embodiment, and details are not described herein again.

Figure 8:
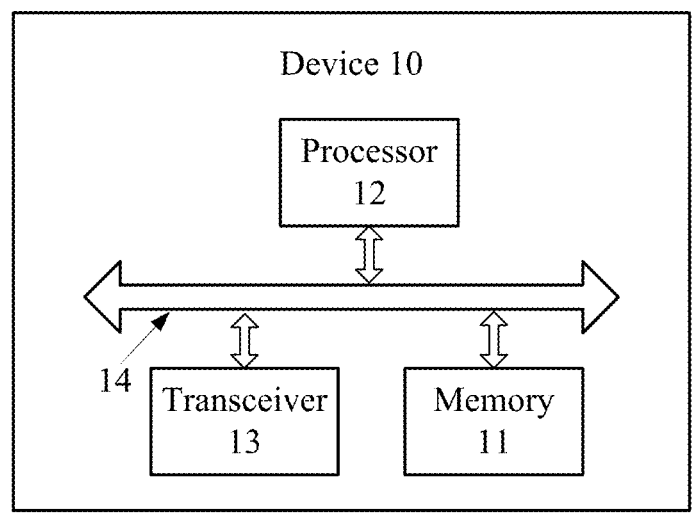
FIG. 8 is another schematic block diagram of a device for transmitting information according to an embodiment of the present disclosure.

FIG. 8 is another schematic block diagram of a device 10 according to an embodiment of the present disclosure. The device 10 shown in FIG. 8 includes: a memory 11, a processor 12, a transceiver 13, and a bus system 14. The memory 11, the processor 12 and the transceiver 13 are connected by the bus system 14, the memory 11 is used for storing instructions, and the processor 12 is used for executing the instructions stored in the memory 11, so as to control the transceiver 13 to receive input data and information, and output data such as operation results.

The processor 12 is configured to transmit a random access message to the second device by the transceiver 13, the random access message carries first dedicated information of the device 10 and/or indication information for indicating second dedicated information of the device 10, and the first dedicated information and the second dedicated information are configured to establish a connection between the device 10 and the second device.

It should be understood that, in the embodiments of the present disclosure, the processor 12 may adopt a General Processing Unit (CPU), a microprocessor, an Application Dedicated Integrated Circuit (ASIC), or one or more integrated circuits, to implement the related program so as to implement the technical solutions provided by the embodiments of the present disclosure.

The memory 11 may include read only memory and random access memory and provides instructions and data to the processor 12. Also, a portion of processor 12 may include a non-volatile random access memory, for example, the processor 12 may also store information of the type of device.

The bus system 14 may include a power bus, a control bus, a state signal bus, and the like in addition to the data bus. However, for clarity of description, various buses are labeled as the bus system 14 in the drawings.

In the implementation process, each step of the above method may be completed by an integrated logic circuit in the form of hardware or instructions in the form of software in the processor 12. The method for wireless communication disclosed in the embodiments of the present disclosure may be directly implemented by a hardware processor, or may be performed by a combination of hardware and software modules in the processor. The software module may be located in a conventional storage medium such as a random access memory, a flash memory, a read only memory, a programmable read only memory or an electrically erasable programmable memory, and a register. The storage medium is located in the memory 11, and the processor 12 reads the information in the memory 11 and completes the steps of the above methods in combination with its hardware. To avoid repetition, it will not be described in detail here.

Optionally, as an embodiment, the random access message carries the indication information, the indication information is configured to indicate the second device to acquire the second dedicated information on a configured first resource, and the processor 12 is further configured to: transmit the second dedicated information by the transceiver 13 on the first resource.

Optionally, as an embodiment, the random access message carries the indication information, the indication information is configured to indicate the device 10 to transmit the second dedicated information to the second device, and the processor 12 is further configured to: transmit the second dedicated information by the transceiver 13 on the second resource.

Optionally, as an embodiment, the random access message carries the first dedicated information and the indication information, and the first dedicated information and the second dedicated information include different information.

Optionally, as an embodiment, the first dedicated information or the second dedicated information includes at least one of the following information: identifier information of the device 10, a reason why the device 10 requests to establish a connection, a size and/or a format of a first signaling to be transmitted by the device 10, Public Land Mobile Network (PLMN) information registered by the device 10, Mobility Management Entity (MME) information of the device 10, and Non-Access Network (NAS) information of the device 10.

Optionally, as an embodiment, the first dedicated information or the second dedicated information includes a size and/or a format of the first signaling, the first signaling is configured to request to establish a connection between the device 10 and the second device, and the processor 12 is further configured to: receive uplink resource allocation information that is determined by the second device according to the size and format of the first signaling by the transceiver 13, and transmit the first signaling to the second device according to the uplink resource allocation information.

Optionally, the device 10 may be a terminal device, and the second device may be a network device or a terminal device.

Therefore, the terminal for transmitting information provided by the embodiments of the present disclosure optimizes access process by carrying the first dedicated information of the first device and/or the indication information for indicating the second dedicated information of the first device in the random access message, which may further improve the access control performance of the first device, so that the first device can access the second device faster or more flexibly.

It should be understood that the device 10 according to an embodiment of the present disclosure may correspond to the first device in each method for transmitting information of the embodiments of the present disclosure, and may correspond to the device 400 according to the embodiments of the present disclosure, and the foregoing and other operations and/or functions of the respective modules in the device 10 are respectively implemented for implementing the corresponding processes of each method in FIG. 3 and FIG. 4, which is not described herein again for brevity.

Figure 9:
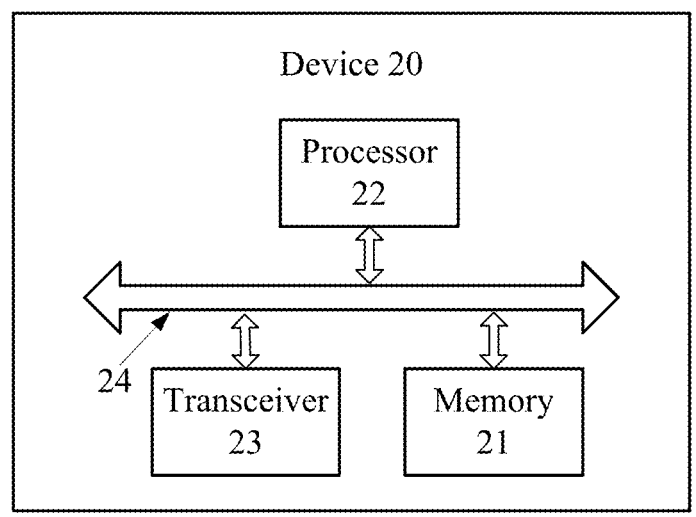
FIG. 9 is another schematic block diagram of a device for transmitting information according to an embodiment of the present disclosure.

FIG. 9 is another schematic block diagram of a device 20 for transmitting information according to an embodiment of the present disclosure. The device 20 shown in FIG. 9 includes: a memory 21, a processor 22, a transceiver 23, and a bus system 24. The memory 21, the processor 22 and the transceiver 23 are connected by the bus system 24, the memory 21 is used for storing instructions, and the processor 22 is used for executing the instructions stored in the memory 21, so as to control the transceiver 23 to receive input data and information, and output data such as operation results.

The processor 22 is configured to receive a random access message sent by the first device by using transceiver 23, the random access message carries first dedicated information of the first device and/or indication information for indicating second dedicated information of the first device, and the first dedicated information and the second dedicated information are configured to establish a connection between the first device and device 20.

It should be understood that, in the embodiments of the present disclosure, the processor 22 may be a General Processing Unit (CPU), a microprocessor, an Application Dedicated Integrated Circuit (ASIC), or one or more integrated circuits, and may be used to implement the related programs to implement the technical solutions provided by the embodiments of the present disclosure.

The memory 21 may include a read only memory and a random access memory, and provides instructions and data to the processor 22. A portion of the processor 22 may also include a non-volatile random access memory. For example, the processor 22 may also store information of the type of device.

The bus system 24 may include a power bus, a control bus, a state signal bus, and the like in addition to the data bus. However, for clarity of description, various buses are labeled as the bus system 24 in the drawings.

In the implementation process, each step of the above method may be completed by an integrated logic circuit of hardware or instructions in the form of software in the processor 22. The method for wireless communication disclosed in the embodiments of the present disclosure may be directly implemented by a hardware processor, or may be performed by a combination of hardware and software modules in the processor. The software module may be located in a conventional storage medium such as a random access memory, a flash memory, a read only memory, a programmable read only memory or an electrically erasable programmable memory, and a register. The storage medium is located in the memory 21, and the processor 22 reads the information in the memory 21 and completes the steps of the above methods in combination with its hardware. To avoid repetition, it will not be described in detail here.

Optionally, as an embodiment, the random access message carries the indication information, the indication information is configured to indicate the device 20 to acquire the second dedicated information on a configured first resource, and the processor 22 is further configured to: acquire the second dedicated information on the first resource according to the indication information.

Optionally, as an embodiment, the random access message carries the indication information, the indication information is configured to indicate the device 20 to acquire the second dedicated information on a configured first resource, and the processor 22 is further configured to: acquire the second dedicated information on the configured second resource.

Optionally, as an embodiment, the random access message carries the first dedicated information, and the processor 22 is further configured to: acquire the first dedicated information from the random access message.

Optionally, as an embodiment, the random access message carries the first dedicated information and the indication information, and the first dedicated information and the second dedicated information include different information.

Optionally, as an embodiment, the first dedicated information or the second dedicated information includes at least one of the following information: identification information of the first device, reason why the first device requests to establish a connection, a size and/or a format of a first signaling to be transmitted by the first device, Public Land Mobile Network (PLMN) information registered by the first device, Mobility Management Entity (MME) information of the first device, and Non-Access Network (NAS) information of the first device.

Optionally, as an embodiment, the first dedicated information or the second dedicated information includes a size and/or a format of the first signaling, the first signaling is configured to request to establish a connection between the first device and the second device, and the processor 22 is further configured to: determine uplink resource allocation information of the first device according to the size and format of the first signaling; transmit the uplink resource allocation information to the first device by the transceiver 23; and receive the first signaling sent by the first device according to the uplink resource allocation information by the transceiver 23.

Optionally, the first device may be a terminal device, and the device 20 may be a network device or a terminal device.

Therefore, the device for transmitting information provided by the embodiments of the present disclosure optimizes the access process by receiving a random access message carrying the first dedicated information of the first device and/or the indication information indicating the second dedicated information of the first device, which may further improve the network access control performance, so that the first device may access the second device better or more flexibly.

It should be understood that the device 20 according to the embodiments of the present disclosure may correspond to the second device in each method 300 of transmitting information of the embodiments of the present disclosure, and may correspond to the device 500 according to the embodiments of the present disclosure, and the foregoing and other operations and/or functions of the respective modules in the device 20 are respectively implemented in order to implement the corresponding processes of the respective methods in FIG. 4 and FIG. 5, and are not described herein again for brevity.

It should be understood that in the embodiments of the present disclosure, "B corresponding to A" means that B is associated with A, and B may be determined according to A. However, it should also be understood that determining B from A does not mean that B is determined solely from A, and B may also be determined based on A and/or other information.

It should be understood that the term "and/or" herein is merely an association relationship describing associated objects, indicating that there are three relationships, for example, A and/or B may mean three conditions including: A exists separately, A and B exist at the same time, and B exists separately. In addition, the character "/" in this article generally indicates that the contextual objects are an "or" relationship.

It should also be understood that, in various embodiments of the present disclosure, the sequence numbers of the above processes do not imply a sequence of executions, and the order of executions of the processes should be determined by the function and internal logic, and the implementation process of the embodiments of the present disclosure should not be construed as limiting.

Those of ordinary skill in the art will appreciate that the elements and algorithm steps of the various examples described in connection with the embodiments disclosed herein may be implemented in electronic hardware or a combination of computer software and electronic hardware. Whether these functions are performed in hardware or software depends on the dedicated application and design constraints of the technical solutions. Those of ordinary skill in the art may use different methods for implementing the described functions for each particular application, but such implementation should not be considered to be beyond the scope of the present disclosure.

Those of ordinary skill in the art may clearly understand that for the convenience and brevity of the description, the specific working process of the system, the device and the unit described above may refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be other division manner, for example, multiple units or components may be combined or may be integrated into another system, or some features may be ignored or not executed. In addition, the coupling or direct coupling or communication connection shown or discussed may be an indirect coupling or communication connection through some interface, device or unit, and may be electrical, mechanical or other forms.

The units described as separate components may or may not be physically separated, and the components displayed as units may or may not be physical units, that is, they may be located in one place, or may be distributed to multiple network units. Some or all of the units may be selected according to actual needs to achieve the purpose of the solutions of the embodiments.

In addition, each functional unit in each embodiment of the present disclosure may be integrated into one processing module, or may exist physically separately, or two or more units may be integrated into one unit.

The functions may be stored in a computer readable storage medium if implemented in the form of a software functional unit and sold or used as a standalone product. In view of this, the technical solution of the present disclosure, or the part of the solutions contributing to the prior art or the part of the technical solutions, may be embodied in the form of a software product, and the computer software product is stored in a storage medium and includes instructions for causing a computer device (which may be a personal computer, server, or network device, etc.) to perform all or part of the steps of the methods described in various embodiments of the present disclosure. The foregoing storage medium may include various mediums for storing program codes, such as a USB drive, a mobile hard disk, a Read-Only Memory (ROM), a Random Access Memory (RAM), a magnetic disk, or an optical disk.

The above is only the specific embodiments of the present disclosure, and the protection scope of the present disclosure is not limited thereto. Any of changes or substitutions that could be thought of by the ordinary skill in the art within the technical scope of the present disclosure should be covered by the protection scope of the present disclosure. Therefore, the protection scope of the present disclosure should be determined by the protection scope of the appended claims.

What is claimed is:

1. A method for transmitting information, comprising:
   transmitting, by a first device, a random access message to a second device, wherein the random access message carries at least one of first dedicated information, that is used to establish a connection between the first device and the second device, of the first device and indication information for indicating second dedicated information, that is used to establish a connection between the first device and the second device, of the first device;
   wherein, the random access message carries the indication information, the indication information is used to indicate the second device to acquire the second dedicated information on one of first resources configured, and the method further comprises:
transmitting, by the first device, the second dedicated information on one of the first resources configured;
wherein, the first dedicated information or the second dedicated information comprises at least one of a size and a format of a first signaling, the first signaling is used to request to establish the connection between the first device and the second device, and the method further comprises:
receiving uplink resource allocation information transmitted by the second device, wherein the uplink resource allocation information is determined according to at least one of the size and the format of the first signaling; and
transmitting the first signaling to the second device according to the uplink resource allocation information.

2. The method according to claim 1, wherein, the random access message carries the first dedicated information and the indication information, and the first dedicated information and the second dedicated information comprise different information.

3. The method according to claim 1, wherein, the first device is a terminal device, and the second device is a network device or a terminal device.

4. The method according to claim 1, wherein, the first dedicated information or the second dedicated information further comprises at least one of the following information: identification information of the first device, a cause value to establish a connection, at least one of a size and a format of a first signaling to be transmitted by the first device, Public Land Mobile Network (PLMN) information registered by the first device, Mobility Management Entity (MME) information of the first device, and Non-Access Network (NAS) information of the first device.

5. A method for transmitting information, comprising:
receiving, by a second device, a random access message transmitted by a first device, wherein the random access message carries at least one of first dedicated information, that is used to establish a connection between the first device and the second device, of the first device and indication information for indicating second dedicated information, that is used to establish a connection between the first device and the second device, of the first device,
wherein, the random access message carries the indication information, the indication information is used to indicate the second device to acquire the second dedicated information on one of first resources configured, and the method further comprises:
acquiring, by the second device, the second dedicated information on one of the first resources configured according to the indication information;
wherein, the first dedicated information or the second dedicated information comprises at least one of a size and a format of a first signaling, the first signaling is used to request to establish the connection between the first device and the second device, and the method further comprises:
determining uplink resource allocation information of the first device according to at least one of the size and the format of the first signaling;
transmitting the uplink resource allocation information to the first device; and
receiving the first signaling which is transmitted by the first device according to the uplink resource allocation information.

6. The method according to claim 5, wherein, the random access message carries the first dedicated information, and the method further comprises:
acquiring, by the second device, the first dedicated information from the random access message.

7. The method according to claim 5, wherein, the random access message carries the first dedicated information and the indication information, and the first dedicated information and the second dedicated information comprise different information.

8. The method according to claim 5, wherein, the first device is a terminal device, and the second device is a network device or a terminal device.

9. The method according to claim 5, wherein, the first dedicated information or the second dedicated information further comprises at least one of the following information: identification information of the first device, a cause value to establish a connection, at least one of a size and a format of a first signaling to be transmitted by the first device, Public Land Mobile Network (PLMN) information registered by the first device, Mobility Management Entity (MME) information of the first device, and Non-Access Network (NAS) information of the first device.

10. A device for transmitting information, wherein, the device is a first device, and the device comprises:
a processor; and
a memory for storing instructions executable by the processor;
wherein the processor is configured to:
transmit a random access message to a second device, wherein the random access message carries at least one of first dedicated information, that is used to establish a connection between the first device and the second device, of the first device and indication information for indicating second dedicated information, that is used to establish a connection between the first device and the second device, of the first device,
wherein, the random access message carries the indication information, the indication information is used to indicate the second device to acquire the second dedicated information on one of first resources, and the processor is further configured to:
transmit the second dedicated information on one of the first resources configured;
wherein, the first dedicated information or the second dedicated information comprises at least one of a size and a format of a first signaling, the first signaling is used to request to establish the connection between the first device and the second device, the processor further configured to:
receive uplink resource allocation information transmitted by the second device, wherein the uplink resource allocation information is determined according to at least one of the size and the format of the first signaling; and
transmit the first signaling to the second device according to the uplink resource allocation information.

11. The device according to claim 10, wherein, the random access message carries the first dedicated information and the indication information, and the first dedicated information and the second dedicated information comprise different information.

12. The device according to claim 10, wherein, the first device is a terminal device, and the second device is a network device or a terminal device.

13. The device according to claim 10, wherein, the first dedicated information or the second dedicated information further comprises at least one of the following information: identification information of the first device, a cause value to establish a connection, at least one of a size and a format of a first signaling to be transmitted by the first device, Public Land Mobile Network (PLMN) information registered by the first device, Mobility Management Entity (MME) information of the first device, and Non-Access Network (NAS) information of the first device.

14. A device for transmitting information, wherein, the device is a second device, and the device comprises:
- a processor; and
- a memory for storing instructions executable by the processor;
- wherein the processor is configured to perform the method for transmitting information according to claim 5.

* * * * *